US009020542B2

(12) United States Patent  
McConnell (10) Patent No.: US 9,020,542 B2  
(45) Date of Patent: Apr. 28, 2015

(54) SYSTEMS AND METHODS FOR USER-INITIATED LOCATION-BASED SERVICES THROUGH MESSAGING

(75) Inventor: James T. McConnell, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1325 days.

(21) Appl. No.: 11/562,339

(22) Filed: Nov. 21, 2006

(65) Prior Publication Data

US 2008/0119200 A1     May 22, 2008

(51) Int. Cl.
    *H04W 4/00*     (2009.01)
    *H04W 4/02*     (2009.01)
    *H04W 4/12*     (2009.01)

(52) U.S. Cl.
    CPC .. *H04W 4/02* (2013.01); *H04W 4/12* (2013.01)

(58) Field of Classification Search
    CPC ................................. H04W 40/20; H04W 4/02
    USPC ......................................... 455/456.1; 370/316
    See application file for complete search history.

(56) References Cited

U.S. PATENT DOCUMENTS

| 6,690,292 | B1 | 2/2004 | Meadows et al. |
| 6,992,991 | B2 | 1/2006 | Duske et al. |
| 2002/0129109 | A1* | 9/2002 | Nozaki et al. ................. 709/206 |
| 2003/0138080 | A1 | 7/2003 | Nelson et al. |
| 2004/0030493 | A1 | 2/2004 | Pechatnikov et al. |
| 2004/0202117 | A1 | 10/2004 | Wilson et al. |
| 2005/0288036 | A1* | 12/2005 | Brewer et al. .............. 455/456.2 |
| 2006/0148488 | A1* | 7/2006 | Syrbe ......................... 455/456.1 |
| 2006/0173612 | A1* | 8/2006 | Steel ............................. 701/207 |
| 2007/0032945 | A1* | 2/2007 | Kaufman ...................... 701/208 |
| 2008/0096519 | A1* | 4/2008 | Miegel ....................... 455/404.2 |

* cited by examiner

*Primary Examiner* — Marcos Batista (57) ABSTRACT

Systems and methods for user-initiated location-based services through messaging. Using a messaging client running on a communication device, a user transmits location information via a text and/or instant message to a recipient. The location information may be obtained from a GPS program or other location determining program accessible or installed on the user's communication device. A network identifier such as a URL is created based on the location information and is appended into the message. When the recipient selects the network identifier, electronic content such as a graphic map including the sender's location is displayed on the recipient's communication device.

20 Claims, 7 Drawing Sheets

Figure 2

Map Output

SYSTEMS AND METHODS FOR USER-INITIATED LOCATION-BASED SERVICES THROUGH MESSAGING

BACKGROUND INFORMATION

Since the United States Government made the NAVSTAR satellite constellation's timing signals available for civilian use in the 1980s, location-based services have become increasingly popular. Many automobile manufacturers now offer global positioning satellite (GPS)-based locator devices as an option. These units are typically integrated into the vehicles' dashboard console. Also, other companies make aftermarket GPS devices for mounting in automobiles, boats and other vehicles, and even hand held devices for hiking, exploring or other recreational uses. Such GPS devices offer relatively high accuracy and universal availability and thus provide an acceptable solution for relatively inexpensive, precise positioning.

In order to meet FCC enhanced 911 (E911) requirements and to provide consumers with a mechanism for accessing location information using an appliance they already, own, commercial mobile radio service providers (CMRSPs) have prompted their device manufacturers to integrate GPS receivers into phones, PDAs and other communication appliances supported by their networks. As a result, users are able to view map and location information directly on their phones, PDAs, etc.. The capability and accuracy of the devices are constrained by native memory of the device. Also, the data used by the devices is static and therefore becomes outdated quickly.

DETAILED DESCRIPTION OF THE PREFERRED EMBODIMENTS

The following description is intended to convey a thorough understanding of the embodiments described by providing a number of specific embodiments and details involving user-initiated location-based services through messaging. It should be appreciated, however, that the present invention is not limited to these specific embodiments and details, which are exemplary only.

As used herein, the term "messaging" will be interpreted broadly to include sending a message through an instant messaging client, such as AOL Instant Messenger, Yahoo Messenger, etc., as well as sending messages through short message service (SMS) such as with a mobile phone or other communication device. Therefore, sending a message in the context of this disclosure and claims may include sending either type of message with a phone, PDA, computer or other communication device.

Figure 1:
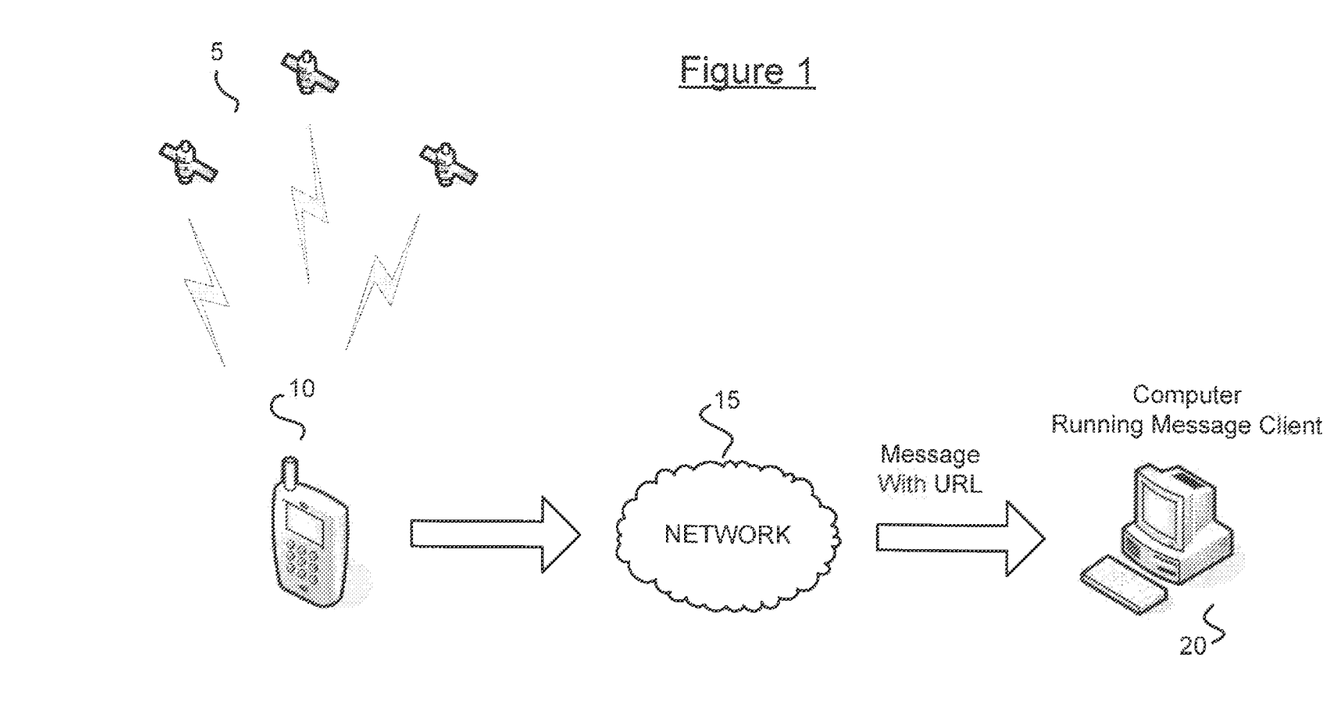
FIG. 1 is a schematic diagram of a system for implementing user-initiated location-based services through messages according to an exemplary embodiment.

Referring now to FIG. 1, a schematic diagram of a system for implementing user-initiated location-based services through messages according to an exemplary embodiment. The system comprises a first user communication device 10 in communication with a second user computer 20 via a communication network 15. In a preferred embodiment, the first user communication device may be a mobile communication device such as a mobile phone, PDA, messaging device or other portable communication device. In a preferred embodiment, the user communication device 10 may be equipped with a locator function such as, for example, a GPS receiver that is operable to determine a location of the first user communication device 10 at an instant in time based on timing signals received from the GPS satellite constellation 5. In various other embodiments, the first user communication device 10 may not comprise a locator function itself, but rather may be capable of requesting location information from a locator device, such as GPS device (not shown), that is in electrical communication with the first user communication device 10, or a location service which may be available through network 15 (e.g., location service using wireless tower triangulation techniques). In various embodiments, the first user communication device 10 may be equipped with a software client, such as an instant messaging client. Alternatively, or in combination, the first user communication device 10 may send messages using SMS protocol.

In at least one exemplary embodiments, the first user communication device 10 includes a send location function that may be configured to send the device's 10 location upon request in a message to a designated recipient. This may be done during a messaging session, automatically at the start of a session, or as a means of starting a messaging session/sending a message. That is, if the first user communication device 10 is running a messaging client, the client may have a "send location" control for permitting a user to selectively cause the client to send the user's location. If the first user communication device is messaging using SMS, "send location" may be an option available when sending text messages. That is, the user may be prompted "Send location?" or alternatively, the user may select "send location" from a list of available message attributes.

It should be appreciated that although, for ease of illustration purposes, the network 15 depicted in FIG. 1 is shown as a single network path between the first user communication device 10 and the second user computer 20, the network 15 may actually be comprised of various combinations of radio (e.g., cellular), landline and/or satellite-based PSTN or IP networks. For example, the first user communication device 10 may broadcast an RF signal containing a message to a cellular tower. The tower in turn may pass this signal to a land or satellite-based network for delivery to the intended recipient. The recipient may interface to the network 15 using a DSL, cable, fiber, T1 or T3 landline, an 802.11x, RF, IR, or other wireless connection, or using another connection protocol as is well known.

Furthermore, although the second user computer 20, that is, the recipient's terminal, is shown in the Figure as a desktop computer, it should be appreciated that this device 20 may also be a mobile device, a laptop computer or other network-enabled device that is configured to run a compatible messaging client or to receive SMS compliant messages.

In various embodiments, the message from the sender may include a network identifier that is generated based on the sender's location. In a preferred embodiment, a URL may be generated either at the sender's device 10 or at an intermediary site on the network 15. The URL preferably contains data fields that allow a graphic map to be created and displayed in a browser client of the recipient device 20 upon selection by the recipient. In various embodiments, the graphic map may include an icon or other graphic representation of the location of the sender's device 10 along with information corresponding to the geographic area surrounding the sender.

Figure 2:
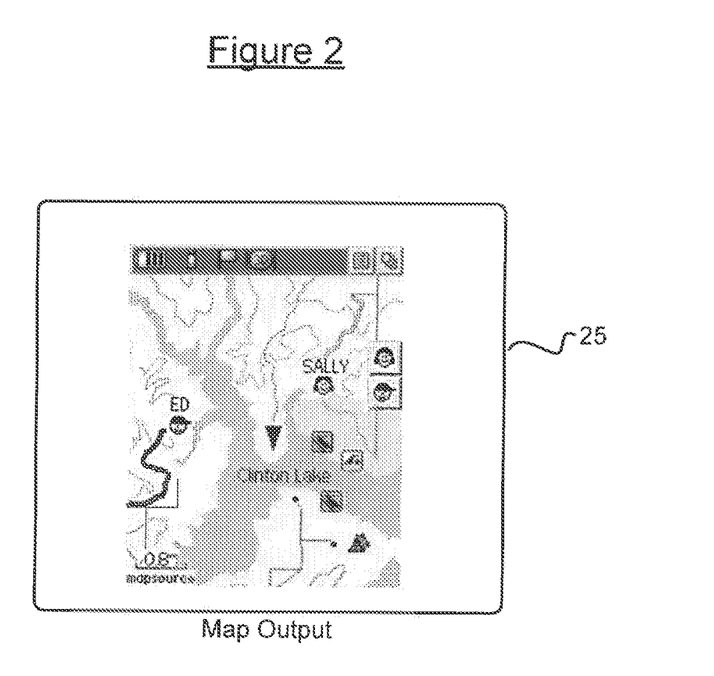
FIG. 2 is a message-based map output to a user computing device including a sender location according to an exemplary embodiment.

Referring now to FIG. 2, a message-based map output 25 to a user computing device including a sender location according to an exemplary embodiment is depicted in this Figure. As discussed above, in various embodiments, when a sender sends a message including the sender's location to a recipient, a URL may be generated and appended to the message based on the location data. In various embodiments, the message may include a hypertext link with a label such as "click here to view sender's location" or "click here to access map." In a preferred embodiment, selecting the provided link may invoke a content browser, such as an Internet content browser, that opens a window on the recipient's device displaying a map, such as the map output 25 depicted in the Figure. In various embodiments, the map may provide a graphic image, such as the name "Ed" and corresponding male icon shown in the map output 25 of FIG. 2. In various embodiments, the map may include the location of businesses, assets, features or other items that are in the area surrounding the sender's location. In various embodiments, the map output 25 may include user controls that allow the viewer to zoom in or out, pan, and even to obtain directions to various features listed on the map, such as, for example, driving directions.

Figure 3:
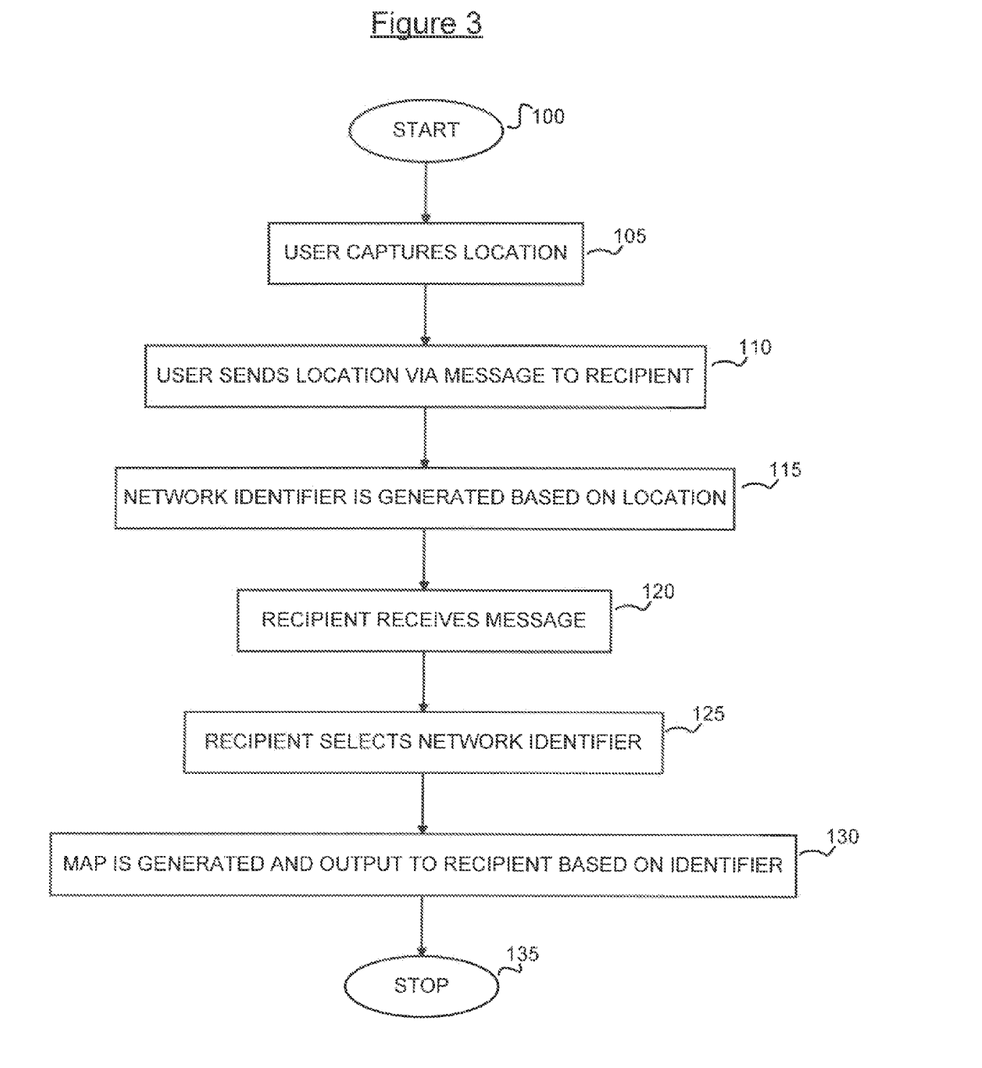
FIG. 3 is a flow chart of an exemplary method for performing user-initiated location-based services through messaging from a user perspective according to an exemplary embodiment.

Referring now to FIG. 3, this Figure provides a flow chart of an exemplary method for performing user-initiated location-based services through messaging from a user perspective according to an exemplary embodiment. The method begins in block 100. In block 105, the user captures his/her location. In various embodiments the user may select a control on his/her communication device that causes his device to obtain the current location of the device. In a preferred embodiment, this may be accomplished by obtaining location information from a GPS receiver in the user's device. Alternatively, the user's device may obtain the location information from another GPS-enabled device in communication with the user's device. In block 110, the location information is sent in a message to the recipient. In various embodiments, the steps in blocks 105 and 110 may be merged into a single step. That is, when the user selects a "send location" function, the device may obtain its location and send the location in a message to a designated recipient.

In block 115, a network identifier may be created based on the location captured in block 105. In various embodiments, if GPS is the source of the location data, the data is typically in a national marine electronics association (NMEA) 0183 format. Thus, in block 115, the GPS-generated data may be reformatted into a URL. That is, using a mapping program that accepts latitudinal and longitudinal inputs, a URL may be generated that causes graphic map content to be generated when selected and that may contain an area include the sender's location information. In various embodiments, the URL may be generated at the sender's communication device and simply placed in the message. In various other embodiments, the GPS information may be forwarded to an intermediate party along the network, either in its native NMEA 0183 format or after reformatting. The intermediate party may be a network-based map content provider. The intermediate party may generate a URL based on the location information, append the URL to the message and pass the message on to the recipient over the network in accordance with the sender's instructions. In various embodiments, the URL may contain additional information, such as an address of the map content provider (e.g., www.rmapcompany.com), and an identifier associated with the sender (e.g., a phone number). This additional information may be automatically inserted into the message (from local storage at the sender's device 10) or may be manually specified by the sender in the course of sending the message.

In block 120, the recipient receives the message. This may comprise receiving a new message notification if the message is an SMS-based message, or the message itself may appear in the user's messaging client if the sender and recipient are communicating over one or more well known instant messaging clients. In various embodiments, the network identifier may be visible to the recipient in a portion of the message. In a preferred embodiment, the network identifier may be a URL. In block 125, the recipient selects the network identifier. In a preferred embodiment, the recipient selects the URL with his mouse, stylus or other input device, thereby invoking a browser client and transmitting the information in the URL to the service provider specified in the URL. In various embodiments, in block 130, the services provider may generate a graphic map display based on information in the URL and transmit this graphic map display to the recipient for output in a window of the browser client. In various embodiments, the graphic map may comprise a dynamic web page including interactive elements (e.g., Javascript). This graphic map may include a terrain and/or street map and may preferably show the location of the sender as an icon, or other identifiable character so that the recipient can pinpoint the sender's location with sufficient specificity. In various embodiments, the graphic map may be a map similar to that depicted in FIG. 2. The method stops in block 135.

Figure 4:
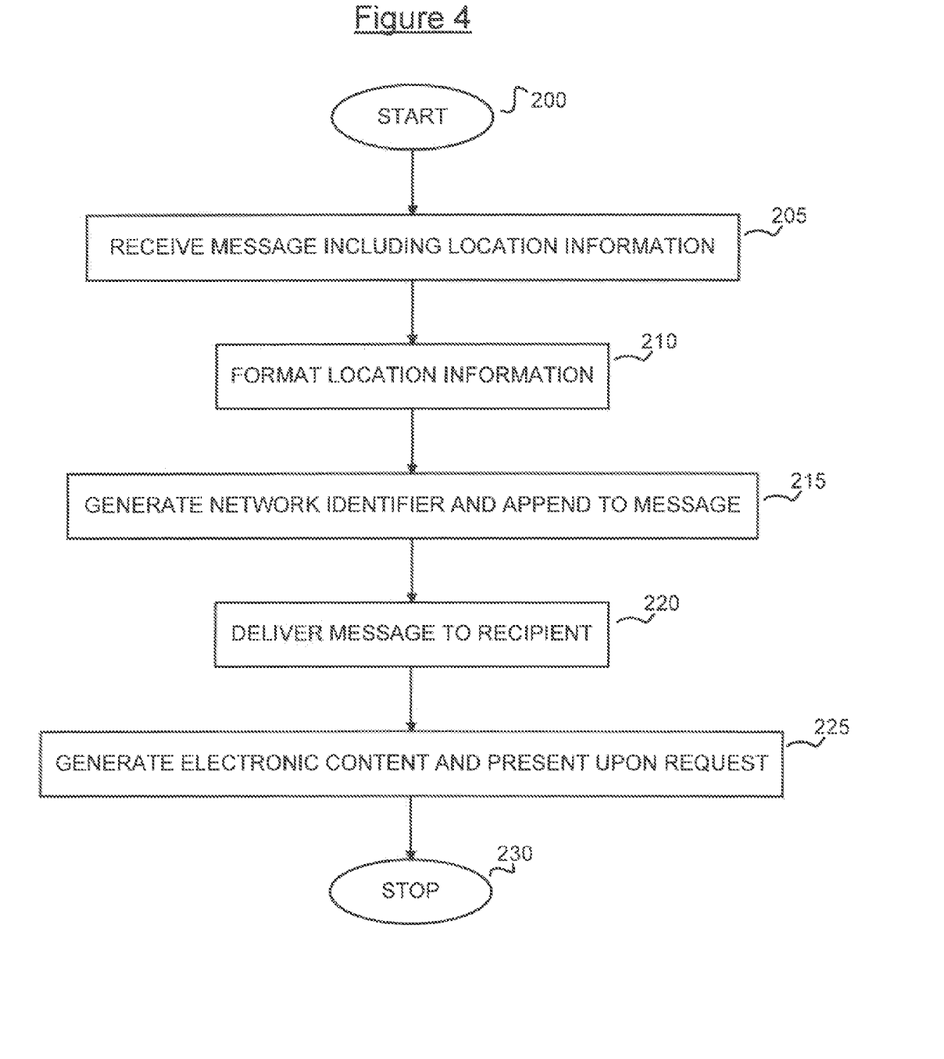
FIG. 4 is a flow chart of an exemplary method for providing user-initiated location-based services through messaging from a provider perspective according to an exemplary embodiment.

Referring now to FIG. 4, this Figure is a flow chart of an exemplary a method for providing user-initiated location-based services through messaging from a provider perspective according to an exemplary embodiment. While the flow chart of FIG. 3 details the steps from the perspective of the service user, this flow chart by contrast does so from the perspective of the provider.

The method begins in block 200. In block 205, a message including location information may be received by the service provider. In various embodiments, the message includes raw GPS data that may be incompatible with service provider-based mapping programs. Thus, in block 210, the location information in the received message may be reformatted into a format that is supported by dynamic network-based mapping programs. In block 215, a network identifier may be generated based on the formatted location information and may be appended to the message. In a preferred embodiment, the system creates a URL based on the location information so that when the URL is selected, a query may be run to generate a map based on the location information in the received message. In some embodiments, the URL further includes an identifier of the network-based map provider and an identifier of the sender (e.g., a phone number). In some embodiments, blocks 210 and 215 may be performed at the sender's device (e.g., using software available at the sender's device) prior to sending the message to the service provider.

In block 220, the message is delivered to the recipient. As discussed above, this may comprise delivering an SMS-based message or simply another message in an instant messaging session. In block 225, upon receipt of a request from the recipient (for example, a request that includes the information from the URL), electronic content may be created and output to the device that sent the request. In a preferred embodiment, this comprises outputting a graphic map containing an area surrounding the location specified in the location information and more preferably it comprises an icon or other visible character representative of that location. A name, telephone number or instant messaging ID of the sender associated with the location information may also be displayed on the graphic map in relation to the icon or other visible character. This may be provided based on the sender identification in the URL, and may include retrieval of sender-designated display information (e.g., specified text, icon, etc.). Information associated with items of interest in the region displayed by the graphic map may also be retrieved by the service provider and displayed using various icons on the graphic map. The graphic map may include dynamic elements which permit the recipient to exchange control information with the service provider to control the displayed region of the graphic map and/or the types of information displayed by the graphic map. The method stops in 230.

It should be appreciated that in the method of FIG. 4, the service provider may perform one or all of the steps recited therein. For example, in various embodiments, the sending user's communication device may generate a properly formatted message including a URL to be delivered directly to the recipient, either as an SMS message or an instant message. In such embodiments, the service provider may typically provide the functionality that allows the communication device to generate the URL and may provide the content when the recipient selects the network identifiers as well as the actual wireless connection to the network when applicable. However, in other embodiments, the service provider may merely provide the functionality, i.e., application, plug-in or software that enables the sender to generate messages including location information but a third party, such as geographic information service (GIS). Internet content providers such as a Yahoo, Google, Mapquest, etc., may generate the electronic content including the graphic map when the recipient selects the network identifier from the delivered message. As is well known, a wireless service provider typically only provides the portion of the service that is charged for. For example, in sending a text message, the wireless provider may charge for the data bytes sent or a per message charge. However, if the recipient is not one of the provider's subscribers, the provider does not receive revenue for delivering the message. Similarly, if the sender is using an instant message client, the provider may typically charge either on a byte or time basis for data sent from and received by the user's device. Thus, from this it can be inferred that the provider may be providing services only to the extent that it can be involved in the movement of the message. Thus, in the context of block 220 in FIG. 4, delivering the message to the recipient may actually comprise delivering the message from the provider's network to another network, such as a PSTN or Internet backbone network which handles the final delivery of the message.

Figure 5:
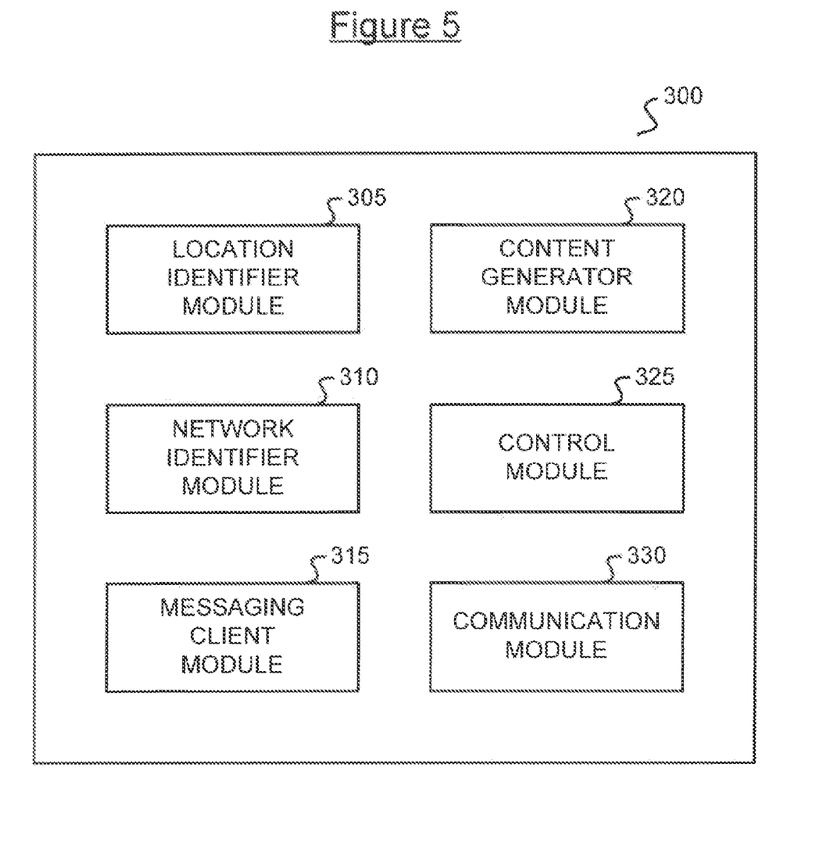
FIG. 5 is block diagram illustrating components of a system for providing user-initiated location-based services through messaging according to an exemplary embodiment.

Referring now to FIG. 5, this Figure depicts a block diagram illustrating components of a system 300 for providing user-initiated location-based services through messaging according to an exemplary embodiment. The system 300 may be comprised of a plurality of modules for performing various system functionality. Each module may comprise a separate software program, a sub-program of a single program, hardware executing software, one or more application specific integrated circuits (ASICs), components of an integrated device, or distributed components in one or more distinct devices. Moreover, the modules depicted in FIG. 5 are exemplary only. Various embodiments may utilize additional or fewer modules and may even use different modules than those shown in the Figure. These modules are meant to be exemplary of the functionality performed by system according to the various embodiments of the disclosure.

The system 300 depicted in FIG. 5 includes a location identifier module 305, a network identifier module 310, a messaging client module 315, a content generator module 320, a control module 325 and a communication module 330. The control module 325 may comprise a central processing unit (CPU) of a computer system, a digital signal processor (DSP), an ASIC, a combination of hardware and software and may even be representative of a real time kernel of a control program for facilitating user-initiated location-based services through messaging.

In various embodiments, the location identifier module 305 may be adapted to provide a location of a user's communication device upon request. As discussed herein, the location identifier module 305 may communicate with a GPS transceiver communicatively coupled to the user's communication device and through one or more communication protocols may request the location information from the locator device. In various embodiments, the location identifying module 305 may format the location information into a suitable format for use with the system. In various other embodiments the request for the location information may specify a format.

The network identifier module 310 may take the information supplied by the location identifier module 305 and convert that information into a network identifier, such as a URL, that when selected may cause a content provider to output content in the form of a graphic map based on the location information obtained by the location identifier module 305. In various embodiments, this network identifier module 310 may append this network identifier directly into a message destined for a specified recipient. The network identifier may have access to a data store which includes information such as the address of the mapping service provider and/or an identifier associated with the sending device (e.g., a phone number or user ID).

In various embodiments, the messaging client module 315 may permit the user to send messages over the provider's network. The messaging client module 315 may be a plug-in capable messaging client such as are well known. Alternatively, the messaging client module 315 may be an SMS protocol supported by the user's communication device.

In various embodiments, the content generator module 320 may comprise a network-based content portal, such as in the preferred embodiment, a Internet-based map content provider. In various embodiments the content generator module 320 may be controlled by the messaging service provider, while in various other embodiments, a third party may maintain the content generator module 320. In such embodiments, where the module 320 is maintained by a third party, the network identifier module 310 may format the network identifier in a manner that is compatible with the third party's content generator module 320. In various embodiments, when a message recipient selects a network identifier contained in the message, a content viewing client may be invoked and the recipient may be directed to a network site associated with the identifier. In various embodiments, the identifier may act as a query to the content generator module 320, which, in response may generate content in accordance with one or more field specified in the identifier. However, in other embodiments, the content may already be created—that is after the network identifier is created—so that the identifier may be simply a network reference to static content and therefore contains only an address to the content. In a preferred embodiment, the content generator module 320 may generate a graphic map and output the map to the recipients client application, the map including a location encompassing the location information specified in the network identifier and a visual indicator of the location of the sender within the area encompassed by the graphic map.

The communication module 330 may permit communication between networks such as between a radio (cellular) network and a landline network (PSTN, ATM, etc.). Thus, the communication module 330 may comprise a network interface, gateway, router and/or other suitable hardware and combinations of hardware and software. The communications module 330 may relay messages between subscribers on the same provider network or may merely facilitate a portion of the communication path between the sender and the recipient, such as the wireless portion only if the recipient is connected to a land-based network or another provider's network.

Figure 6:
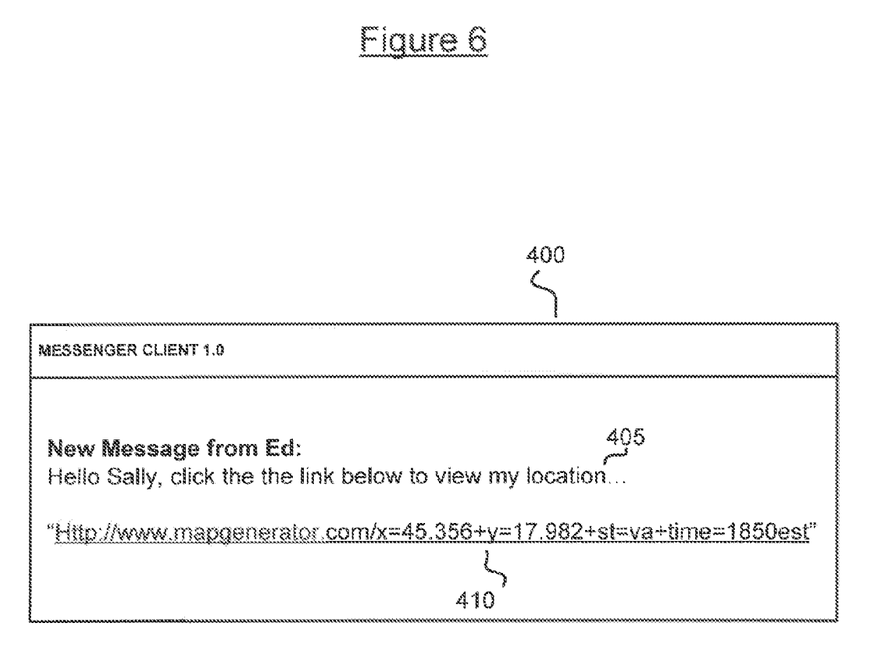
FIG. 6 is an exemplary interface window of a messaging client according to an exemplary embodiment.

Referring now to FIG. 6, this Figure depicts an exemplary interface window 400 of a messaging client according to an exemplary embodiment. The window 400 in the Figure illustrates an exemplary embodiment in which messages are sent via an instant messaging client. Such clients are well known. The messaging client may be running on a computer, mobile telephone, PDA or other wired or wireless communication device. The interface window 400 includes a new message notification and a message requesting the recipient to click a link 410 in the message to view the sender's location. It should be appreciated that in various embodiments, the link 410 may not display the full URL, but rather may be a word, graphic image or other object. As is well known, in hypertext markup language (HTML) any object may be coded to a particular URL in a manner transparent to the user. The exemplary URL 410 depicted in the Figure illustrates how the URL itself may be encoded to contain one or more parameters or input fields (e.g., delimited by "+" sign) thereby enabling it to function as query to the target domain when selected.

Figure 7:
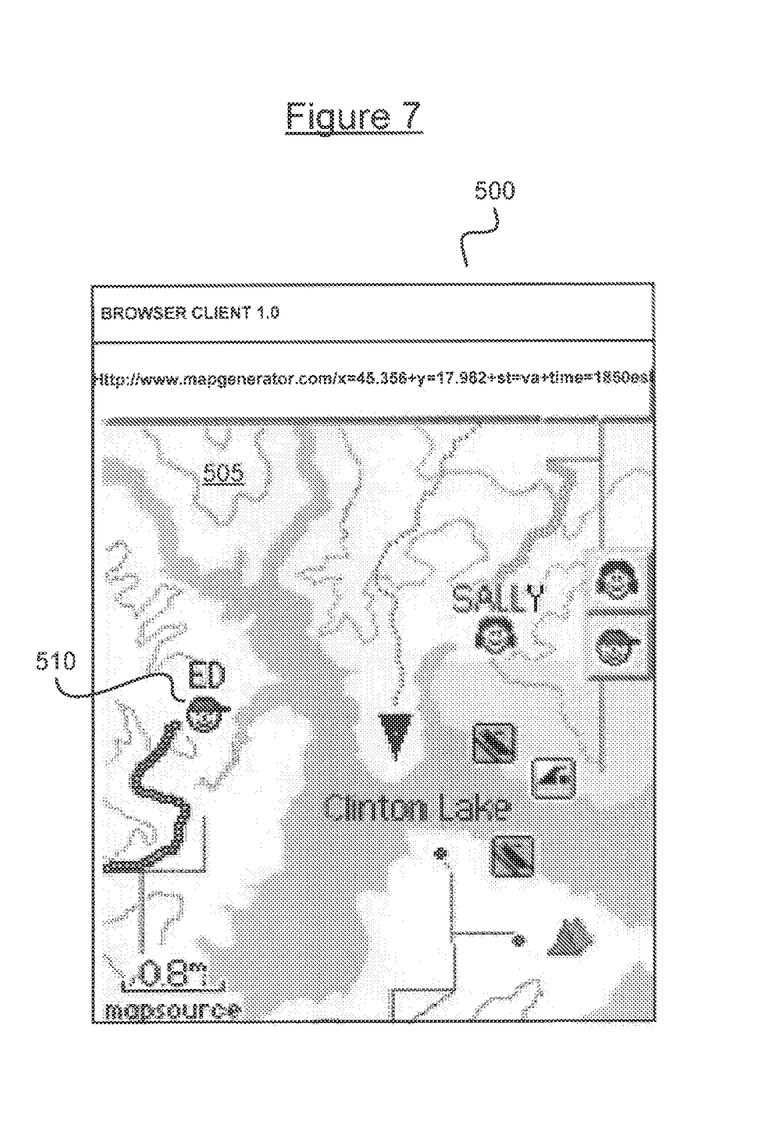
FIG. 7 is an exemplary interface window of a content viewer plug-in for displaying location-based services according to an exemplary embodiment.

FIG. 7 is an exemplary interface window 500 of a content viewer plug-in for displaying location-based services according to an exemplary embodiment. In various embodiments, the interface window 500 may be an Internet browser if the recipient is using a computer to access the message. In various other embodiments, the interface window 500 may be a WAP, or other type of standardized or proprietary mobile device content browser that supports graphic images. In various embodiments, the browser client interface window 500 may be invoked automatically when the recipient selects the network identifier (URL) included in the received message, such as in the example of FIG. 6. In a preferred embodiment, the window 500 displays a graphic map 505. The graphic map 505 may preferably include an icon 510 or other identifier that shows the location of the message sender relative to the other area shown on the graphic map 505. This may also display other items of interest such as businesses, landmarks, or other assets that are in proximity to the sender. Also, in various embodiments the recipient can access typical map functionality through the content viewer plug-in's interface window such as zooming in and out, panning, obtain directions to/from one or more locations displayed on the map 505, etc.

It should be appreciated that although the various embodiments discussed here have been described in the context of messages being sent from a mobile communication device to an computer device, that the principles set forth herein are equally applicable to environments where users are sending messages from a non-mobile computer to another non-mobile computer or when messages are sent between two mobile devices only.

It should also be appreciated that although in the preferred embodiments, location may be derived from a GPS device, in various other embodiments, a different mechanism may be used for locating purposes. For example, various commercial mobile radio service providers (CMRSPs) may use triangulation between transceiver towers, or even a single transceiver tower, or other non-satellite based methods for obtaining location information. In various embodiments, GPS-type precision may not be required.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than a restrictive sense.

The invention claimed is:

1. A method comprising:
receiving a user-initiated text message over a network from a first node that is destined for a second node, the user-initiated text message containing location information corresponding to a dynamic geographic location of the first node, wherein the dynamic geographic location is determined by the first node when the text message is initiated by the user;
automatically generating a network identifier associated with the location information, wherein generating a network identifier associated with the location information comprises generating a uniform resource locator (URL);
delivering the user-initiated text message including the network identifier to the second node;
generating electronic content that is associated with a navigation map that indicates the dynamic geographic location of the first node based on the location information, wherein generating electronic content based on the location information comprises generating a browser supported map showing the dynamic geographic location of the first node based on information specified in the uniform resource locator, wherein the browser supported map further comprises location-based advertising, landmarks, and business locations; and
outputting the electronic content to the second node when the network identifier is selected by an operator at the second node.

2. The method according to claim 1, wherein the location information comprises geographical coordinates that indicate the dynamic geographic location of the first node.

3. The method according to claim 2, wherein the geographical coordinates are supplied by a Global Positioning System (GPS) receiver in communication with the first node.

4. The method according to claim 1, wherein the location information comprises timing information.

5. The method according to claim 4, further comprising determining a location of the first node based on the timing information.

6. The method of claim 1, wherein the browser supported map further includes user controls that allow a viewer to perform one or more of the following: zoom in, zoom out, pan, or obtain directions to one or more features on the map.

7. The method of claim 1, wherein the user-initiated text message received from the first node was automatically generated by the first node at the start of a messaging session.

8. The method of claim 1, wherein the user-initiated text message received from the first node was generated in response to the user selecting a "send location" feature provided by an interface at the first node.

9. The method of claim 1, wherein the dynamic geographic location of the first node shown on the browser supported map comprises an icon including at least one of a name, a telephone number, and an instant messaging ID associated with the first node.

10. A messaging system comprising:
   a messaging client processor configured to receive an electronic message from a first user system operated by a first user, the electronic message including location information corresponding to a dynamic geographic location of the first user system, wherein the dynamic geographic location is determined by the first user system when the electronic message is sent by the first user;
   a network identifier processor communicatively coupled to the message client processor and configured to automatically generate a network identifier based at least in part on the location information, wherein the network identifier comprises a uniform resource locator;
   a communication processor communicatively coupled to the network identifier processor and configured to forward the electronic message to a second user system operated by a second user as specified by the first user, the electronic message including the network identifier; and
   a content generating processor communicatively coupled to the communication processor and configured to generate electronic content that is associated with a navigation map that indicates the dynamic geographic location of the first user system based on information provided in the network identifier in response to the second user selecting the network identifier, wherein generating electronic content based on the location information comprises generating browser supported content that displays the navigation map showing the dynamic geographic location of the first user system based on information specified in the network identifier, wherein the browser supported content further comprises location-based advertising, landmarks, and business locations.

11. The messaging system according to claim 10, wherein the content generating processor comprises computer readable code stored in an electronic storage medium configured to cause a processor to generate electronic content based on one or more input fields specified in the network identifier.

12. The messaging system according to claim 10, wherein the content generating processor is configured to generate content for the first user based on an instruction from the second user and to provide that content to a communication device of the first user.

13. The system of claim 10, wherein the browser supported content further includes user controls that allow a viewer to perform one or more of the following: zoom in, zoom out, pan, or obtain directions to one or more features on the navigation map.

14. The system of claim 10, wherein the electronic message received from the first user system was automatically generated by the first user system at the start of a messaging session.

15. The system of claim 10, wherein the electronic message received from the first user system was generated in response to the first user selecting a "send location" feature provided by an interface at the first user system.

16. The system of claim 10, wherein the dynamic geographic location of the first user system shown on the browser supported map comprises an icon including at least one of a name, a telephone number, and an instant messaging ID associated with the first user system.

17. A method comprising:
   determining a dynamic geographic location of a first network node;
   automatically generating a network identifier based on the dynamic geographic location;
   sending an electronic message to a second network node, the electronic message including the network identifier, wherein the dynamic geographic location of the first network node is determined and the network identifier is generated when the electronic message is sent; and
   providing electronic content that is associated with a navigation map that indicates the dynamic geographic location of the first network node based on information in the network identifier in response to a request sent to a service provider, wherein generating a network identifier comprises generating a URL, wherein providing electronic content associated with navigation map comprises generating browser supported content that displays the navigation map showing the dynamic geographic location of the first network node based on information specified in the URL, wherein the browser supported content further comprises location-based advertising, landmarks, and business locations.

18. The method according to claim 17, wherein determining the dynamic geographic location of the first network node comprises determining one or more geographic coordinates that indicate the dynamic geographic location of the first network node.

19. The method according to claim 17, wherein providing electronic content comprises outputting the navigation map to a second network node.

20. The method according to claim 17, wherein determining the dynamic geographic location of the first network node comprises receiving location information from a GPS device in communication with the first network node.

* * * * *